United States Patent
Umeda et al.

(10) Patent No.: US 10,705,739 B2
(45) Date of Patent: Jul. 7, 2020

(54) MAGNETIC DISK DEVICE AND WRITE METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Michihiko Umeda, Kanagawa (JP); Minoru Yamamoto, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 3 days.

(21) Appl. No.: 16/126,229

(22) Filed: Sep. 10, 2018

(65) Prior Publication Data

US 2019/0272109 A1  Sep. 5, 2019

(30) Foreign Application Priority Data

Mar. 5, 2018  (JP) ................ 2018-038817

(51) Int. Cl.
| | | |
|---|---|---|
| G06F 12/00 | (2006.01) | |
| G06F 3/06 | (2006.01) | |
| G06F 12/0866 | (2016.01) | |
| G06F 12/0804 | (2016.01) | |

(52) U.S. Cl.
CPC .......... *G06F 3/0613* (2013.01); *G06F 3/0656* (2013.01); *G06F 3/0659* (2013.01); *G06F 3/0676* (2013.01); *G06F 12/0804* (2013.01); *G06F 12/0866* (2013.01)

(58) Field of Classification Search
None
See application file for complete search history.

(56) References Cited

U.S. PATENT DOCUMENTS

| | | | |
|---|---|---|---|
| 8,862,805 B2 | 10/2014 | Yamamoto et al. | |
| 9,070,417 B1 | 6/2015 | Nagashima et al. | |
| 9,727,265 B2* | 8/2017 | Kawakami | G06F 3/0625 |
| 10,083,714 B1* | 9/2018 | Matsuo | G11B 27/00 |

FOREIGN PATENT DOCUMENTS

JP  H6-309234 A  11/1994

* cited by examiner

*Primary Examiner* — John A Lane
(74) *Attorney, Agent, or Firm* — White & Case LLP

(57) ABSTRACT

According to one embodiment, a magnetic disk device including a disk, a head configured to write data to the disk, a buffer memory configured to temporarily hold data to be written to the disk, a recorder configured to temporarily hold data to be input from the buffer memory, and a controller configured to transfer first data from the buffer memory to the recorder and to transfer second data corresponding to the first data from the recorder.

18 Claims, 7 Drawing Sheets

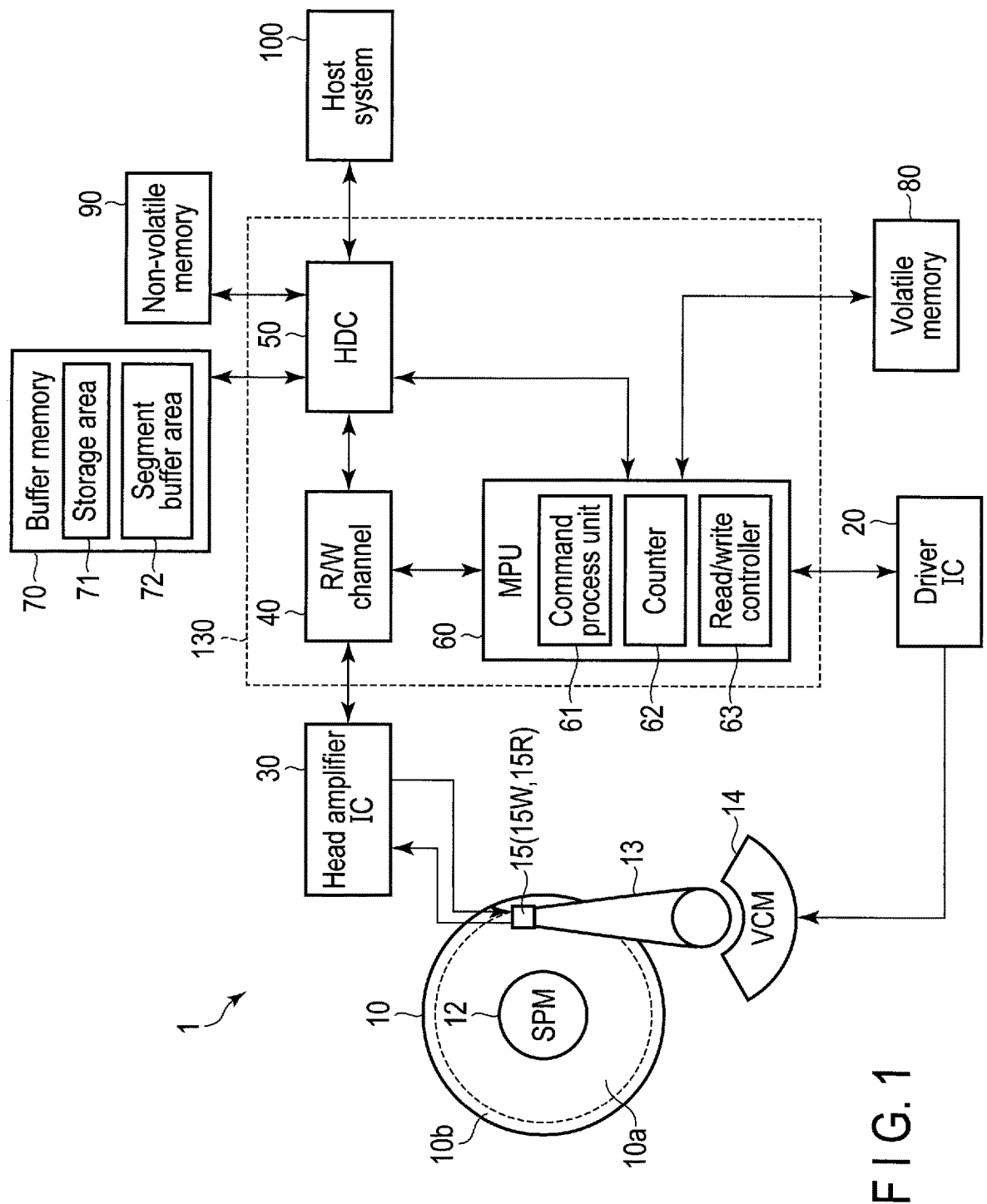
F I G. 1

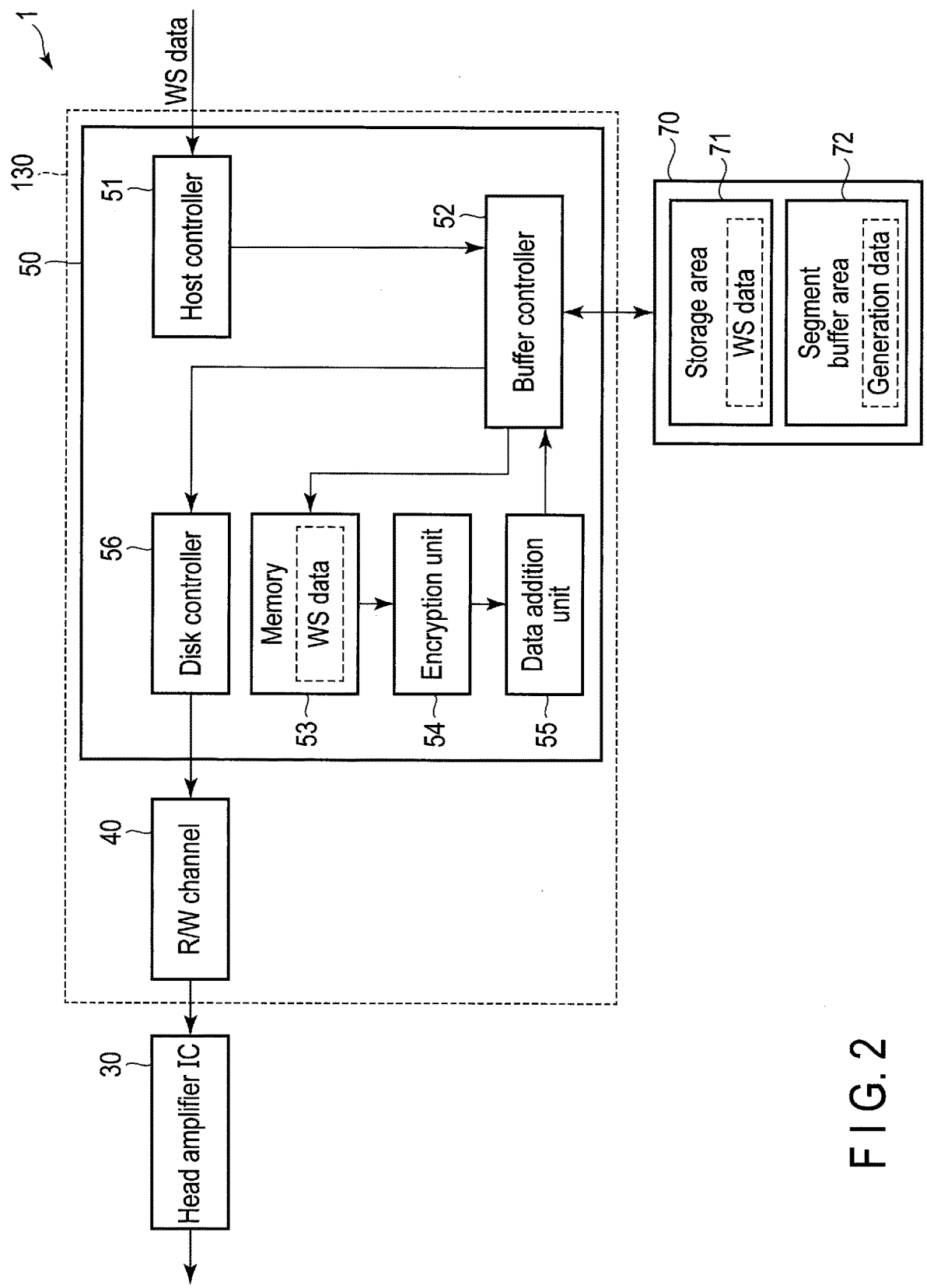
F I G. 2

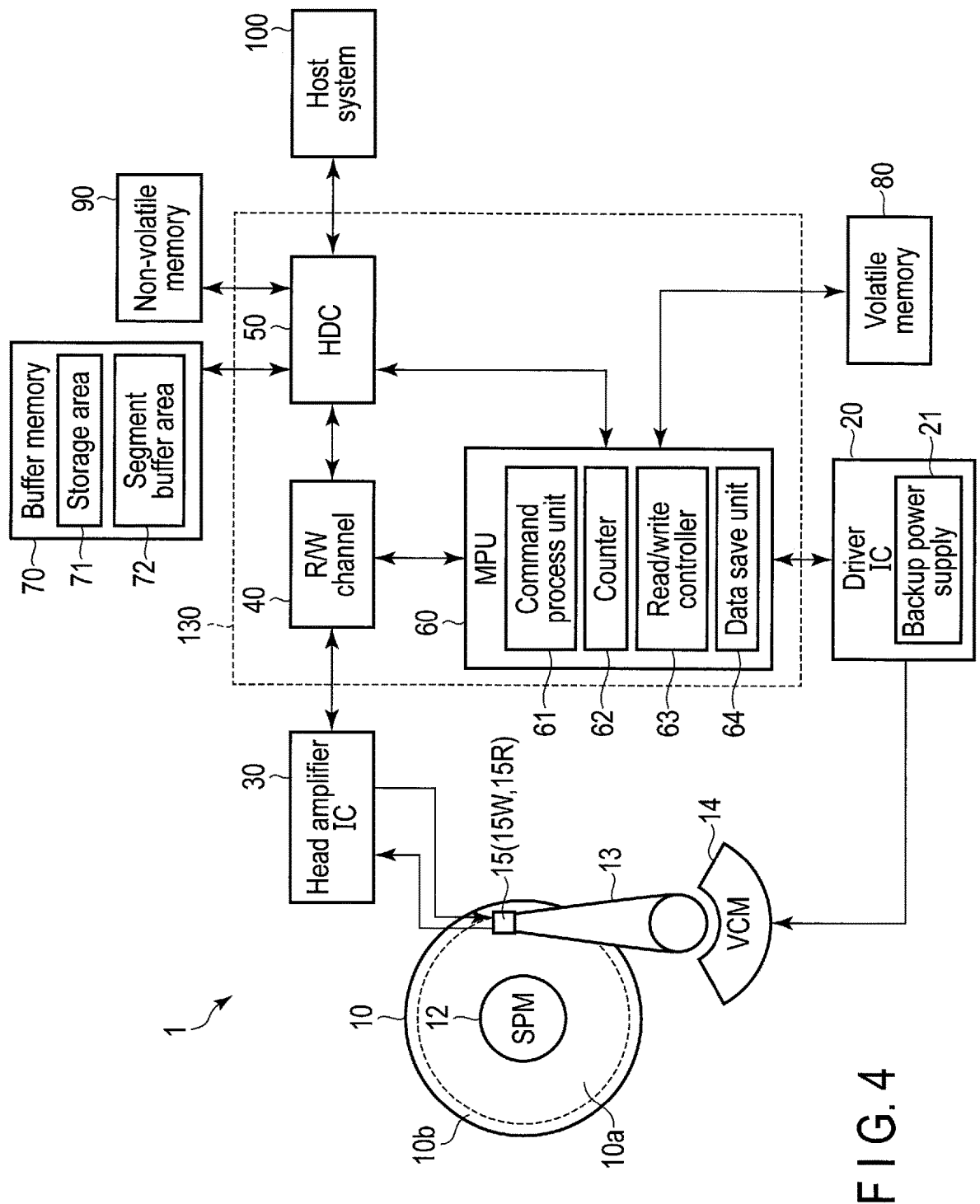
F I G. 4

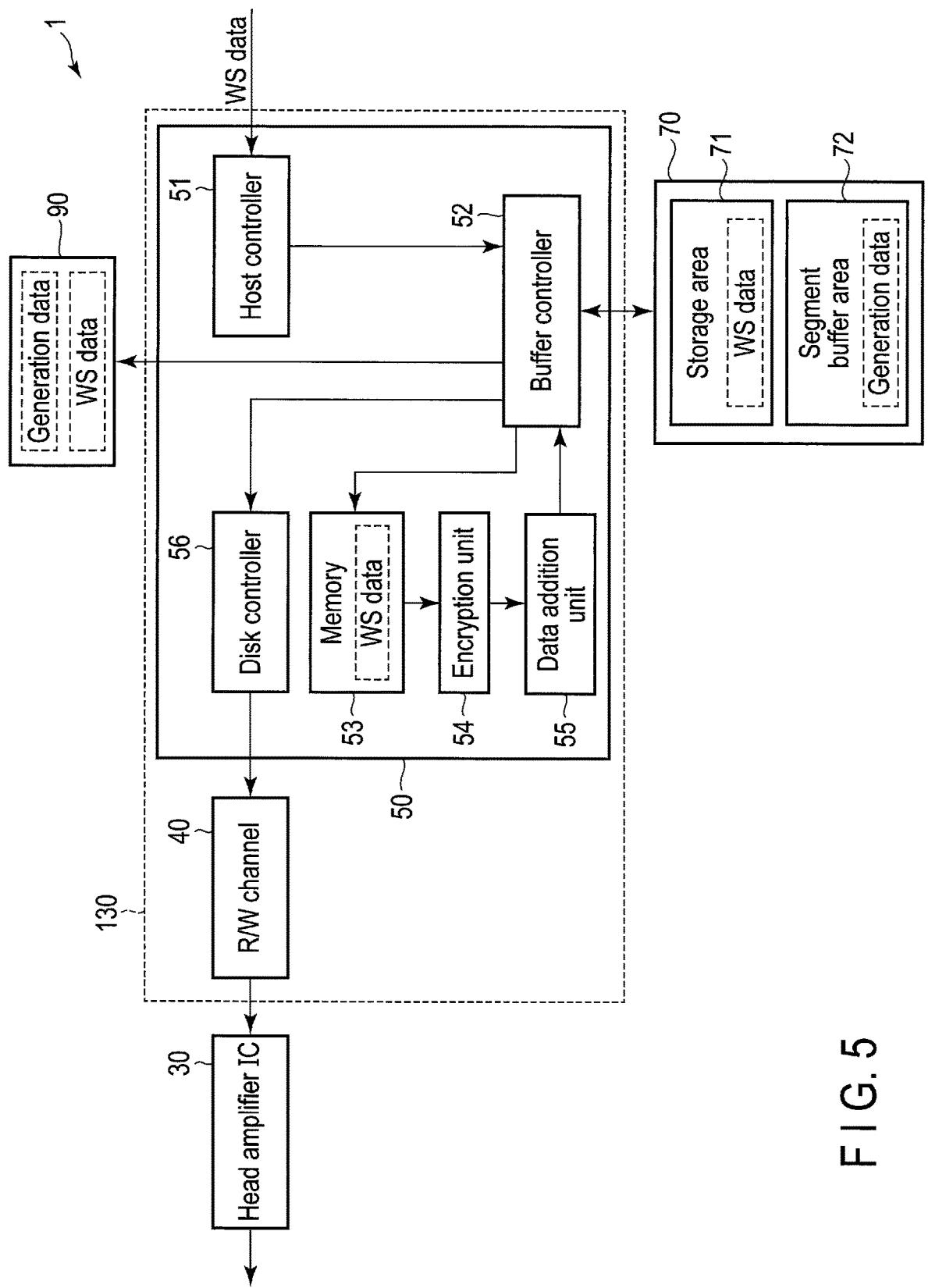
F I G. 5

MAGNETIC DISK DEVICE AND WRITE METHOD

CROSS-REFERENCE TO RELATED APPLICATIONS

This application is based upon and claims the benefit of priority from Japanese Patent Application No. 2018-038817, filed Mar. 5, 2016, the entire contents of which are incorporated herein by reference.

FIELD

Embodiments described herein relate generally to a magnetic disk device and a write method.

BACKGROUND

A magnetic disk device supports a WRITE SAME command. The WRITE SAME command is a command to write a data to a plurality of logical blocks based on particular data. The WRITE SAME command is used at the time of initializing logical blocks in RAID environment, or the like. When the WRITE, SAME command is received, the magnetic disk device executes processings such as receiving particular data received from a host system, generating data of a plurality of logical blocks based on the particular data, and adding encryption or protection information to the generated data of each logical block, and writes each generated data onto the disk. Since the magnetic disk device executes these processings each time the magnetic disk device receives the WRITE SAME command, when the WRITE SAME command is received into the plurality of consecutive logical blocks, it is likely to cause a delay of one rotation waiting for each command.

BRIEF DESCRIPTION OF THE DRAWINGS

FIG. 1 is a block diagram showing a configuration of a magnetic disk device according to a first embodiment;

FIG. 2 is a diagram schematically showing a configuration example of a write system of the magnetic disk device according to the first embodiment;

FIG. 4 is a block diagram showing a configuration of a magnetic disk device according to a second embodiment;

FIG. 5 is a diagram schematically showing a configuration example of a write system of a magnetic disk device according to a second embodiment;

DETAILED DESCRIPTION

Figure 3:
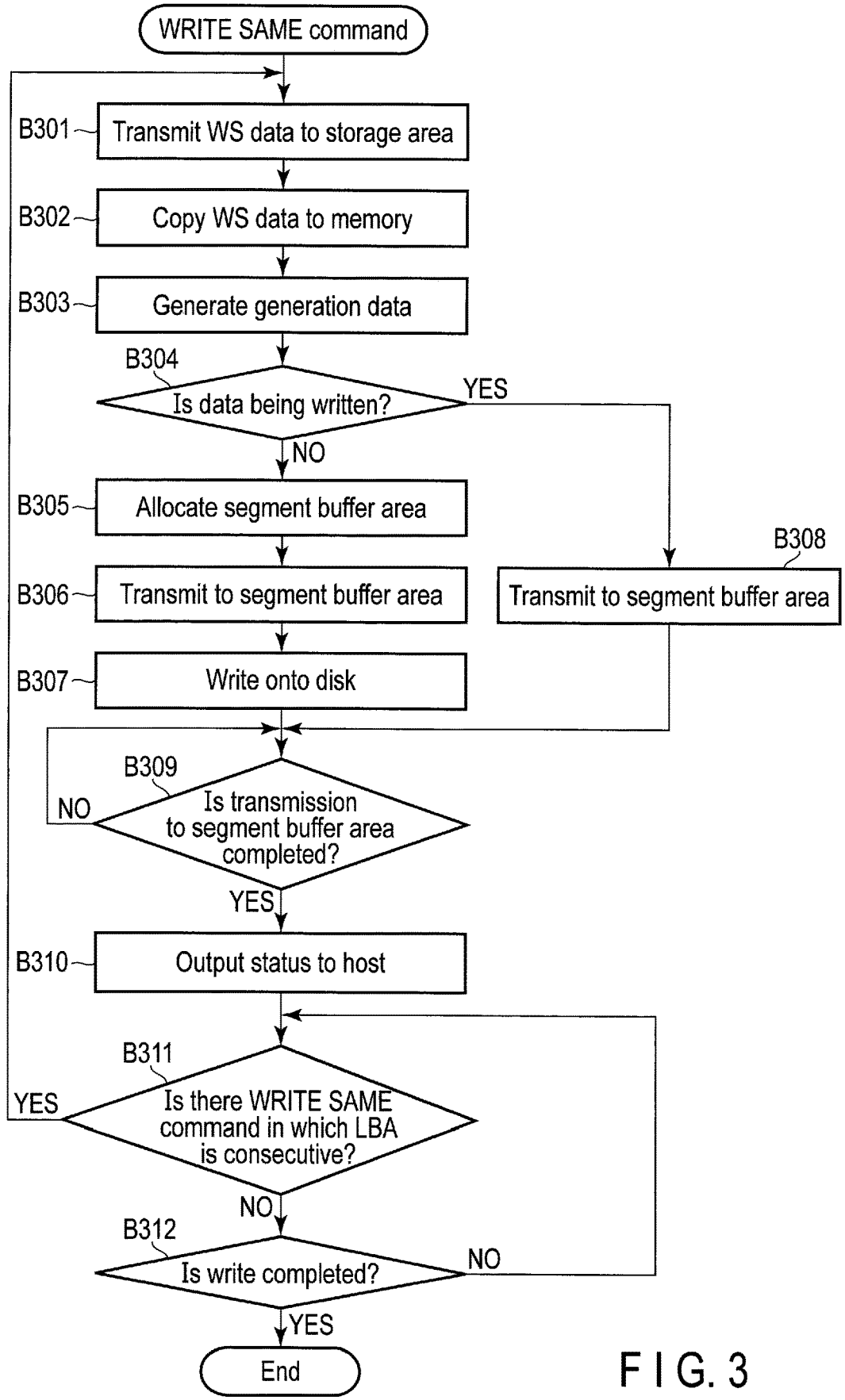
FIG. 3 is a flowchart of an example of a write method according to the first embodiment.

In general, according to one embodiment, a magnetic disk device comprises: a disk; a head configured to write data to the disk; a buffer memory configured to temporarily hold data to be written to the disk; a recorder configured to temporarily hold data to be input from the buffer memory; and a controller configured to transfer first data from the buffer memory to the recorder and to transfer second data corresponding to the first data from the recorder.

According to another embodiment, a magnetic disk device, comprises: a disk; a head configured to write data to the disk; a buffer memory configured to temporarily hold data to be written to the disk; a recorder configured to temporarily hold data to be input from the buffer memory; and a controller configured to transfer first data corresponding to the first WRITE SAME command from the buffer memory to the recorder, to transfer second data corresponding to the first data from the recorder, to the buffer memory, and to sequentially write the second data transferred to the buffer memory, to the disk.

According to another embodiment, A write method applied to a magnetic disk device including a disk, a head configured to write data to the disk, a buffer memory configured to temporarily hold data to be written to the disk, and a recorder configured to temporarily hold the data input from the buffer memory, the write method comprises: transferring first data from the buffer memory to the recorder; and transferring second data corresponding to the first data from the recorder to the buffer memory.

Hereinafter, embodiment of the present invention will be described with reference to the accompanying drawings. It is to be noted that the drawings are merely examples and do not limit the scope of the invention.

First Embodiment

FIG. 1 is a block diagram showing a configuration of a magnetic disk device 1 according to a first embodiment.

The magnetic disk device 1 includes a head disk assembly (HDA), a driver integrated circuit (IC) 20, a head amplifier integrated circuit (hereinafter, referred to as a head amplifier IC or a preamplifier) 30, a buffer memory (buffer) 70, a volatile memory 80, a non-volatile memory 90, and a system controller 130 which is a single chip integrated circuit, which will be described below. In addition, the magnetic disk device 1 is connected to a host system (hereinafter, simply referred to as a host) 100.

The HDA has a magnetic disk (hereinafter, referred to as a disk) 10, a spindle motor (hereinafter, referred to as SPM) 12, an arm 13 mounted with a head 15, and a voice coil motor (hereinafter, referred to as VCM) 14. The disk 10 is attached to the spindle motor 12, and rotates by driving of the spindle motor 12. The arm 13 and the VCM 14 constitute an actuator. The actuator controls movement of the head 15 mounted at the arm 13 to a target position on the disk 10 by driving of the VCM 14. The numbers of disks 10 and heads 15 may be two or more.

A recording area of the disk 10 is allocated a user data region 10a available by a user and a system area 10b to which information necessary for managing a magnetic disk device is stored.

The head 15 comprises a write head 15W and a read head 15R mounted on a slider serving as a main body. The write head 15W writes the data to the disk 10. The read head 15R reads the data recoded to data tracks on the disk 10.

The driver IC 20 controls the driving of the SPM 12 and the VCM 14 according to a control of the system controller 130 (more specifically, a micro processing unit (MPU) 60 to be described below).

The head amplifier IC (the preamplifier) 30 has a read amplifier and a write driver. The read amplifier amplifies a read signal read from the disk 10, and outputs the amplified read signal to the system controller 130 (more specifically, a read/write (R/W) channel 40 to be described below). The write driver outputs a write current corresponding to a signal output from the R/W channel 40 to the head 15.

The buffer memory 70 is a semiconductor memory that temporarily records data, and the like, transmitted and received between the magnetic disk device 1 and the host 100. It is to be noted that the buffer memory 70 may also be configured integrally with the volatile memory 80. The buffer memory 70 is, for example, a DRAM, a static random access memory (SRAM), a SDRAM, a ferroelectric random access memory (FeRAM), a magnetoresistive random access memory (MRAM), or the like. The buffer memory 70 has, for example, a storage area 71 and a segment buffer area 72. The segment buffer area 72 serves as, for example, a first in first out (FIFO) or a circular buffer. In addition, it is to be noted that the buffer memory 70 may not include the storage area 71 and the segment buffer area 72.

The volatile memory 80 is a semiconductor memory in which saved data are lost when a supply of power is cut off. The volatile memory 80 stores data, and the like, necessary for processing in the respective portions of the magnetic disk device 1. The volatile memory 80 is, for example, an SRAM a dynamic random access memory (DRAM) or a synchronous dynamic random access memory (SDRAM).

The non-volatile memory 90 is a semiconductor memory that records saved data even though power supply is interrupted. The non-volatile memory 90 is, for example, a NOR-type or NAND-type flash read-only memory (FROM).

The system controller (controller) 130 is realized using, for example, a large scale integration (LSI) called a system-on-a-chip (SoC) in which a plurality of elements are integrated in a single chip. The system controller 130 includes a read/write (R/W) channel 40, a hard disk controller (HDC) 50, and a micro processing unit (MPU) 60. The system controller 130 is electrically connected to, for example, the driver IC 20, the head amplifier IC 30, the buffer memory 70, the volatile memory 80, the non-volatile memory 90, the host system 100 and the like.

The R/W channel 40 performs signal processing on read data transmitted from the disk 10 to the host 100 and write data transmitted from the host 100, in response to an instruction from the MPU 60 to be described below. The R/W channel 40 has a circuit or function for measuring signal quality of the read data. The R/W channel 40 is electrically connected to the head amplifier IC 30, the HDC 50, the MPU 60 and the like. It is to be noted that the read data and the write data may be simply referred to as data.

The HDC 50 controls data transmission between the host 100 and the R/W channel 40 in response to an instruction from the MPU 60 to be described below. The HDC 50 is electrically connected to the R/W channel 40, the MPU 60, the buffer memory 70, the non-volatile memory 90 and the like.

The MPU 60 is a controller which controls each unit of the magnetic disk device 1. The MPU 60 controls the VCM 14 through the driver IC 20 to perform a servo control for executing positioning of the head 15. The MPU 60 determines a destination to save the write data while controlling an operation of writing data to the disk 10. In addition, the MPU 60 controls the processing on the read data while controlling an operation of reading data from the disk 10. The MPU 60 is connected to each unit of the magnetic disk device 1. For example, the MPU 60 is electrically connected to the driver IC 20, the R/W channel 40, the HDC 50, and the volatile memory 80.

The MPU 60 includes a command process unit 61, a counter 62, and a read/write controller 63. The MPU 60 executes processing on these units, for example, the command process unit 61, the counter 62, the read/write controller 63, and the like on firmware. It is to be noted that the MPU 60 may also include these units as circuits. In addition, other units of the system controller 130, such as the R/W channel 40 and the HDC 50, may have these units.

The command process unit 61 has a command queue capable of receiving a plurality of commands from the host 100. The command process unit 61 executes processing corresponding to the command received from the host 100. The command includes an operation code, the number of transfer blocks to be transmitted to the disk 10, or information on a position of the disk 10 on which data are written, for example, a logical block address (LBA). For example, the command process unit 61 generates a plurality of data based on particular data received from the host 100, and can execute processing corresponding to a command to write a plurality of generation data, which are generated, to the disk 10, for example, a WRITE SAME command. When receiving the WRITE SAME command from the host 100, the command process unit 61 generates a plurality of data (hereinafter, referred to as generation data for convenience of description) based on data related to the WRITE SAME command (hereinafter, referred to as WRITE SAME (WS) data). For example, a plurality of LBAs each corresponding to a plurality of generation data generated based on the WS data are consecutive. It is to be noted that the number of transfer blocks may be 1. Hereinafter, the plurality of generation data generated based on one WS data are sometimes referred to as a generation data group. The generation data may also include information included in the WS data. In addition, the information included in the WS data may be recorded as other data linked to the generation data in a memory, for example, a memory 53 to be described below, the volatile memory 80, the non-volatile memory 90 or the like. A data size of the WS data and a data size of the generation data each are a data size which is used in the case of transmitting data or in the case of reading and writing data. As one example, the data size of the WS data and the data size of the generation data are the same. For example, the data sizes of the WS data and the data size of the generation data are a 1 logical block size. The 1 logical block size is, for example, 512 bytes or 4 Kbytes. For example, the command process unit 61 allows, for example, the HDC 50 to generate a plurality of generation data corresponding to the number of transfer blocks based on the WS data.

When consecutively (sequentially) receiving the plurality of WRITE SAME commands, the command process unit 61 determines whether the positions of the disk 10 to which each of the plurality of the generation data groups, which are generated, is written, are consecutive or not based on the WS data each corresponding to the plurality of WRITE SAME commands. For example, when a WRITE SAME command (hereinafter, referred to as a current WRITE SAME command) to be currently processed after a WRITE SAME command (hereinafter, referred to as a immediately previous WRITE SAME command) which is processed immediately before are consecutively received, the command process unit 61 determines whether an LBA of a first generation data in the generation data group generated based on the WS data corresponding to the current WRITE SAME command is consecutive or not to an LBA of a last generation data in the generation data group generated based on the WS data corresponding to the immediately previous WRITE SAME command. Hereinafter, for convenience of explanation, "the WS data corresponding to the immediately previous WRITE SAME command" is referred to as the "immediately previous WS data", and the "WS data corresponding to the current WRITE SAME command" is referred to as the "current WS data". The "generation data group generated based on the immediately previous WS data" is referred to as the "immediately previous generation data group", and the "generation data group generated based on the current WS data" is referred to as the "current generation data group". The "last generation data within the generation data group generated based on the immediately previous WS data" is referred to as "the last generation data corresponding to the immediately previous WS data", and the "first generation data group within the generation data group generated based on the current WS data" is referred to as the "first generation data corresponding to the current WS data". In addition, "the position of the disk 10 on which the last generation data corresponding to the immediately previous WS data is written, or the LBA" is referred to as "the last position or the LBA corresponding to the immediately previous WS data", and "the position of the disk 10 on which the first generation data corresponding to the current WS data is written, or the LBA is referred to as "the first position or the LBA corresponding to the current WS data". If it is determined that the last LBA corresponding to the immediately previous WS data is consecutive to the first LBA corresponding to the current WS data, the command process unit 61 outputs a signal (hereinafter, referred to as a sequential signal) indicating that the last LBA corresponding to the immediately previous WS data is consecutive to the first LBA corresponding to the current WS data to the counter 62, the read/write controller 63 or the like. In other words, if it is determined that the last LBA corresponding to the immediately previous WS data and the first LBA corresponding to the current WS data are sequentially accessible, the command process unit 61 outputs the sequential signal to the counter 62, the read/write controller 63 or the like.

The counter 62 counts data. For example, the counter 62 adds a value corresponding to the number of transfer blocks specified by the WRITE SAME command to a write count value indicating the number of blocks of the generation data to be transmitted to the disk 10. When receiving the sequential signal, the counter 62 adds the value corresponding to the number of transfer blocks designated by the current WRITE SAME command to the write count value. The counter 62 increases a transmission count value indicating the number of blocks of the generation data transmitted to the segment buffer area 72 by a fixed value, for example, by 1 each time the transmission of the generation data to the buffer memory 70, for example, the segment buffer area 72 is completed. The counter 62 decreases the transmission count value and the write count value by the fixed value, for example, by 1 each time the generation data transmitted to the segment buffer area 72 are written to the disk 10 or each time the generation data are transmitted to the disk 10. Hereinafter, the "increasing by the fixed value, for example, by 1" is referred to as "incrementing" and the "decreasing by the fixed value, for example, by 1" is referred to as "decrementing". It is to be noted that it is not necessary for the counter 62 to count the write count value. For example, the counter 62 increments the transmission count value indicating the number of blocks of the generation data transmitted to the segment buffer area 72 each time the transmission of the generation data to the segment buffer area 72 is completed, and may decrement the transmission count value each time the generation data transmitted to the segment buffer area 72 is written to the disk 10 or transmitted to the disk 10.

The read/write controller 63 controls the data read processing and the write processing according to the processing of the command process unit 61. The read/write controller 63 controls the VCM 14 via the driver IC 20, positions the head 15 at a target position on the disk 10, and executes the read processing and the write processing. When executing the write processing, the read/write controller 63 allocate the segment buffer area 72 in the buffer memory 70.

The read/write controller 63 outputs a signal to the host 100 when the processing related to the command received from the host 100 is completed. For example, if it is determined that the transmission count value reaches a value corresponding to the number of transfer blocks included in the WS data, the read/write controller 63 outputs a signal (hereinafter, referred to as a command completion status) indicating that the processing of the WRITE SAME command is completed to the host 100.

The read/write controller 63 can control the write processing to the disk 10 according to the count value. For example, if it is determined that the write count value is 0, that is, valid generation data are not recorded in the segment buffer area 72, the read/write controller 63 suppresses the write processing of the generation data to the disk 10. In this case, the read/write controller 63 outputs a signal (hereinafter, referred to as a write completion status) indicating that the write processing of the generation data to the disk 10 is completed to, for example, the host 100.

The read/write controller 63 can control the transmission of the generation data to the buffer memory 70, for example, the segment buffer area 72 according to the transmission count value. For example, if it is determined that the transmission count value reaches a threshold value, the read/write controller 63 suppresses the transmission of the generation data to the segment buffer area 72. The threshold value is a count value corresponding to a capacity capable of recording the generation data in the buffer memory 70, for example, a capacity capable of recording the generation data in the segment buffer area 72.

In addition, when receiving the sequential signal, the read/write controller 63 determines whether the write processing to the disk 10 is being performed or not. If it is determined that the write processing is being performed, the read/write controller 63 sequentially transmits a plurality of generation data corresponding to the current WS data to the already allocated segment buffer area 72 and transmits a plurality of generation data corresponding to the current WS data transmitted to the segment buffer area 72 to the disk 10. The read/write controller 63 consecutively writes (sequentially writes) the current generation data group subsequent to the immediately previous generation data group to the disk 10. In one example, the read/write controller 63 sequentially writes the first generation data corresponding to the current WS data subsequent to the last generation data corresponding to the immediately previous WS data to the disk 10.

Hereinafter, in the head 15, the head amplifier IC 30, the buffer memory 70, the volatile memory 80, the non-volatile memory 90, the system controller 130 or the like, the system which writes data transmitted from the host 100 to the disk 10 is sometimes referred to as a write system.

FIG. 2 is a schematic diagram showing a configuration example of the write system of the magnetic disk device 1 according to the first embodiment. FIG. 2 shows only the configuration necessary for the explanation.

As the write system, the HDC 50 includes the host controller 51, the buffer controller 52, the memory (internal memory) 53, the encryption unit 54, a data addition unit 55, and a disk controller 56. These units are connected to each other via a bus (bus) or the like.

The host controller 51 is connected to the host 100, and controls the data transmission with the host 100. For example, when receiving the WS data from the host 100, the host controller 51 transmits the received WS data to the buffer controller 52.

The buffer controller 52 is connected to the buffer memory 70 and controls the data transmission with the buffer memory 70. For example, when the WS data is input, the buffer controller 52 transmits the WS data to the storage area 71 of the buffer memory 70. In addition, the buffer controller 52 replicates (copies) the WS data recorded in the storage area 71 to the memory 53. In other words, the buffer controller 52 transfers the WS data recorded in the storage area 71 to the memory 53 to record the WS data. In addition, when the generation data are input, the buffer controller 52 transmits the generation data to the segment buffer area 72. When the generation data are transmitted to the segment buffer area 72, the buffer controller 52 outputs, for example, the signal for incrementing the transmission count value to the counter 62. When receiving the signal for suppressing the transmission of the generation data from the read/write controller 63 to the segment buffer area 72, the buffer controller 52 suppresses the transmission of the generation data to the segment buffer area 72. In addition, the buffer controller 52 sequentially transmits the plurality of generation data recorded in the segment buffer area 72 to the disk controller 56 according to the LBA.

The memory unit (recorder) 53 holds data. The memory 53 serves as, for example, a FIFO. For example, in the memory 53, the WS data is processed in the copied order, and the plurality of generation data corresponding to the number of transfer blocks are generated based on the WS data. The memory 53 sequentially outputs the plurality of generation data, which are generated, to the encryption unit 54 according to the LEA. The memory 53 may be a register, for example, a shift register.

The encryption unit 54 executes the encryption procession on data. For example, the encryption unit 54 encrypts the input generation data and outputs the encrypted generation data to the data addition unit 55.

The data addition unit 55 adds protection data to the data. The protection data includes data consistency, for example, information indicating whether the data are wrong or not, or the like. The protection data includes, for example, a cyclic redundancy check (CRC) code or the like. For example, the data addition unit 55 adds the protection data to the input generation data and outputs the generation data to the buffer controller 52 by adding the protection data.

The disk controller 56 is connected to the R/W channel 40 and controls the data transmission with the disk 10 via the R/W channel 40. For example, the disk controller 56 transmits the input generation data to the R/W channel 40. For example, when the generation data is transmitted to the R/W channel 40, the disk controller 56 may output a signal for decrementing the transmission count value and the write count value to the counter 62. It is to be noted that when the generation data are transmitted to the R/W channel 40, the disk controller 56 may output a signal for decrementing only the transmission count value to the counter 62. In addition, the signal for decrementing the transmission count value and the write count value may be output from other units such as the head amplifier IC 30 and the R/W channel 40.

FIG. 3 is a flowchart of an example of the write method according to the first embodiment.

When receiving the WRITE SAME command, the system controller 130 transmits the WS data received from the host 100 to the storage area 71 (B301). For example, when receiving the WRITE SAME command, the system controller 130 transmits the WS data received from the host 100 to the storage area 71 and records the WS data in the storage area 71. The system controller 130 copies the WS data transmitted to the storage area 71 to the memory 53 (B302). In other words, the system controller 130 transfers the WS data transferred to the storage area 71 to the memory 53 to record the WS data. The system controller 130 generates the plurality of generation data based on the WS data in the memory 53 (B303). For example, the system controller 130 generates the plurality of generation data corresponding to the number of transfer blocks based on the WS data, executes the encryption processing on each of the plurality of generation data, and adds the protection data to each of the plurality of generation data.

The system controller 130 determines whether data are being written to the disk 10 or not (B304). If it is determined that data are not being written to the disk 10 (NO in B304), the system controller 130 allocate the segment buffer area 72 in the buffer memory 70 (B305). The system controller 130 sequentially transmits the plurality of generation data to the segment buffer area 72 (B306), sequentially writes at least one generation data sequentially transmitted to the segment buffer area 72 to the disk 10 (B307) and proceeds to the processing of B309. For example, the system controller 130 sequentially transmits the plurality of generation data to the segment buffer area 72 according to the LBA, and temporarily records the plurality of generation data in the segment buffer area 72. If it is determined that data are being written (YES in B304), the system controller 130 sequentially transmits the plurality of generation data to the segment buffer area 72 allocated in advance (B308). For example, the system controller 130 sequentially transmits the plurality of generation data to the segment buffer area 72, which is allocated in advance, according to the LBA, and temporarily records the plurality of generation data in the segment buffer area 72.

The system controller 130 determines whether the transmission of the generation data group to the segment buffer area 72 is completed or not (B309). For example, the system controller 130 determines whether the transmission of the plurality of generation data corresponding to the number of transfer blocks to the segment buffer area 72 is completed or not. If it is determined that the transmission of the plurality of generation data corresponding to the number of transfer blocks is not completed (NO in B309), the system controller 130 returns to the processing of B309. If it is determined that the transmission of the plurality of generation data corresponding to the number of transfer blocks is completed (YES in B309), the system controller 130 outputs a command completion status to the host 100 (B310).

The system controller 130 determines whether the WRITE SAME commands to the consecutive LBAs are received or not from the host 100 (B311). If it is determined that the WRITE SAME command to the consecutive LBAs is received (YES in B311), the system controller 130 returns to the processing of B301. If it is determined that the WRITE SAME command to the consecutive LBAs is not received (NO in B311), the system controller 130 determines whether the processing of writing all the generation data to the disk 10 is competed or not (B312). For example, the system controller 130 determines whether the write count value or the transmission count value is 0 or not. If it is determined that the write processing of all the generation data is not completed. (NO in B312), the system controller 130 returns to the processing of B311. If it is determined that the write processing of all the generation data is completed (YES in B312), the system controller 130 ends the processing.

According to the first embodiment, the magnetic disk device 1 includes the buffer memory 70 and the system controller 130. The buffer memory 70 has, for example, the storage area 71 and the segment buffer area 72. The system controller 130 includes the R/W channel 40, the HDC 50, and the MPU 60. The HDC 50 includes the host controller 51, the buffer controller 52, the memory 53, the encryption unit 54, and the data addition unit 55. When the WRITE SAME command is received, the magnetic disk device 1 records the WS data in the storage area 71 and replicates (copies) the WS data to the memory 53. The magnetic disk device 1 allocates the segment buffer area 72 in the buffer memory 70. The magnetic disk device 1 generates the plurality of generation data based on the WS data in the memory 53, executes the encryption processing on each of the plurality of generation data which are generated, adds the protection data to each of the plurality of generation data, sequentially transmits the plurality of generation data to the segment buffer area 72 according to the LBA, and sequentially writes the plurality of generation data to the disk 10 according to the LBA. When the current WRITE SAME command is received while the generation data group corresponding to the immediately previous WRITE SAME command is being written to the disk 10, the magnetic disk device 1 determines whether the current generation data group sequentially accesses the immediately previous generation data group or not. If it is determined that the current generation data group sequentially accesses the immediately previous generation data group, the magnetic disk device 1 sequentially writes the current generation data group, following the immediately previous generation data group. For this reason, when the current WRITE SAME command is received while the generation data group corresponding to the immediately previous WRITE SAME command is being written to the disk 10, the magnetic disk device 1 can sequentially write the current generation data group, following the immediately previous generation data group, without waiting for the rotation of the disk 10. Therefore, the magnetic disk device 1 can improve the write performance.

Next, a magnetic disk device according to another embodiment will be described. In another embodiment, the same reference numerals are given to the same components as in the above-described embodiment, and a detailed description thereof will be omitted.

Second Embodiment

A magnetic disk device 1 of a second embodiment is different from that of the above-described first embodiment in that data are saved when power supplied from a power supply is cut off or lowered.

FIG. 4 is a block diagram showing a configuration of the magnetic disk device 1 according to the second embodiment.

A driver IC 20 includes a backup power supply 21. It is to be noted that a part of the backup power supply 21, for example, a rectifier circuit may be provided outside the driver IC 20.

When the power supplied from the power supply (hereinafter, referred to as a main power supply) of the magnetic disk device 1 is cut off or lowered (hereinafter, referred to as a case in which abnormality occurs in the main power supply), the backup power supply 21 supplies power required to hold a protection operation of the magnetic disk device 1. The protection operation includes, for example, an operation of moving the head 15 to a position away from the disk 10 or an operation of writing or copying (hereinafter, sometimes referred to as saving) data by a power loss protection (PLP) function. The PLP function is a function of guaranteeing unwritten data by saving write data (hereinafter, referred to as "unwritten data"), in which the write processing to the disk 10 is not completed, in a non-volatile memory or the like when abnormality occurs in the main power supply. When abnormality occurs in the main power supply, the backup power supply 21 supplies power to at least the buffer memory 70, the non-volatile memory 90, the system controller 130 and the like. The backup power supply 21 uses, for example, a counter electromotive force of the SPM 12 to generate the supply power. It is to be noted that the backup power supply 21 may use a capacitor, which is charged by the main power supply, to generate the supply power.

The MPG 60 further includes a data save unit 64. The MPU 60 executes the processing of the data save unit 64 or the like on firmware. It is to be noted that the MPG 60 may also include the data save unit 64 as a circuit. In addition, other units of the system controller 130, such as the R/W channel 40 and the HDC 50, may have the data save unit 64.

In the second embodiment, if it is determined that a transmission count value (the number of blocks that have not been written yet) is equal to or smaller than a value corresponding to the number of blocks of generation data (hereinafter, referred to as a value which can be saved) which can be saved, the read/write controller 63 outputs a command completion status to a host 100. The value which can be saved is, for example, a value corresponding to the number of blocks of the generation data, which can be saved in the non-volatile memory 90, within the time when the power supplied from the backup power supply 21 can be held. It is to be noted that if it is determined that the transmission count value is equal to or smaller than the value which can be saved, the read/write controller 63 may output the command completion status to the host 100.

The data save unit 64 has a function of managing the unwritten data. In this way, the function of managing the unwritten data may be referred to as, for example, a persistent write cache (PWC) function. When abnormality occurs in the main power supply, the data save unit 64 executes the data protection operation by receiving the power temporarily supplied from the backup power supply 21 by the PLP function.

For example, when abnormality occurs in the main power supply, the data save unit 64 saves, in the non-volatile memory 90, the WS data which is recorded in the storage area 71 and at least one generation data (hereinafter, referred to as the unwritten generation data) which is recorded in the segment buffer area 72. In this case, the data save unit 64 may save information (hereinafter, referred to as WS command information) on the WRITE SAME command corresponding to the WS data recorded in the storage area 71 in the non-volatile memory 90. In addition, the data save unit 64 may also save, in the non-volatile memory 90, the position of the disk 10 to which the unwritten generation data recorded in the segment buffer area 72 are written, for example, information (hereinafter, referred to as generation data information) on the number of remaining transfer blocks (hereinafter, referred to as the number of remaining blocks) or the like, in which the generation data which have been written to the disk 10 are excluded, in the number of transfer blocks corresponding to the LBA or the WS data. When the main power supply is restored, the data save unit 64 executes a data restoring operation.

For example, when the main power supply is restored, the data save unit 64 transmits the saved unwritten generation data from the non-volatile memory 90 to the segment buffer area 72. In this case, the data save unit 64 transmits the WS data from the non-volatile memory 90 to the memory 53 or the storage area 71. In addition, the data save unit 64 again generates (restores), by the HDC 50, at least one generation data (hereinafter, referred to as the remaining generation data) of the number of remaining blocks from the generation data corresponding to the next LBA of the unwritten generation data corresponding to the last LBA within at least one unwritten generation data saved in the non-volatile memory 90, based on the WS data and the generation data information saved in the non-volatile memory 90. It is to be noted that when abnormality occurs in the main power supply, the data save unit 64 may save only the WS data recorded in the storage area 71 in the non-volatile memory 90. When the main power supply is restored, the data save unit 64 may again generate the generation data group by the HDC 50 based on the WS data saved in the non-volatile memory 90.

FIG. 5 is a schematic diagram showing a configuration example of a write system of the magnetic disk device 1 according to the second embodiment. FIG. 5 shows only the configuration necessary for the explanation.

When abnormality occurs in the main power supply, the buffer controller 52 transmits, for example, the WS data recorded in the storage area 71 and at least one unwritten generation data recorded in the segment buffer area 72 to the non-volatile memory 90. When the main power supply is restored, the buffer controller 52 transmits, for example, at least one unwritten generation data from the non-volatile memory 90 to the segment buffer area 72. In this case, the buffer controller 52 transmits the WS data from the non-volatile memory 90 to the memory 53 and the storage area 71.

Figure 6:
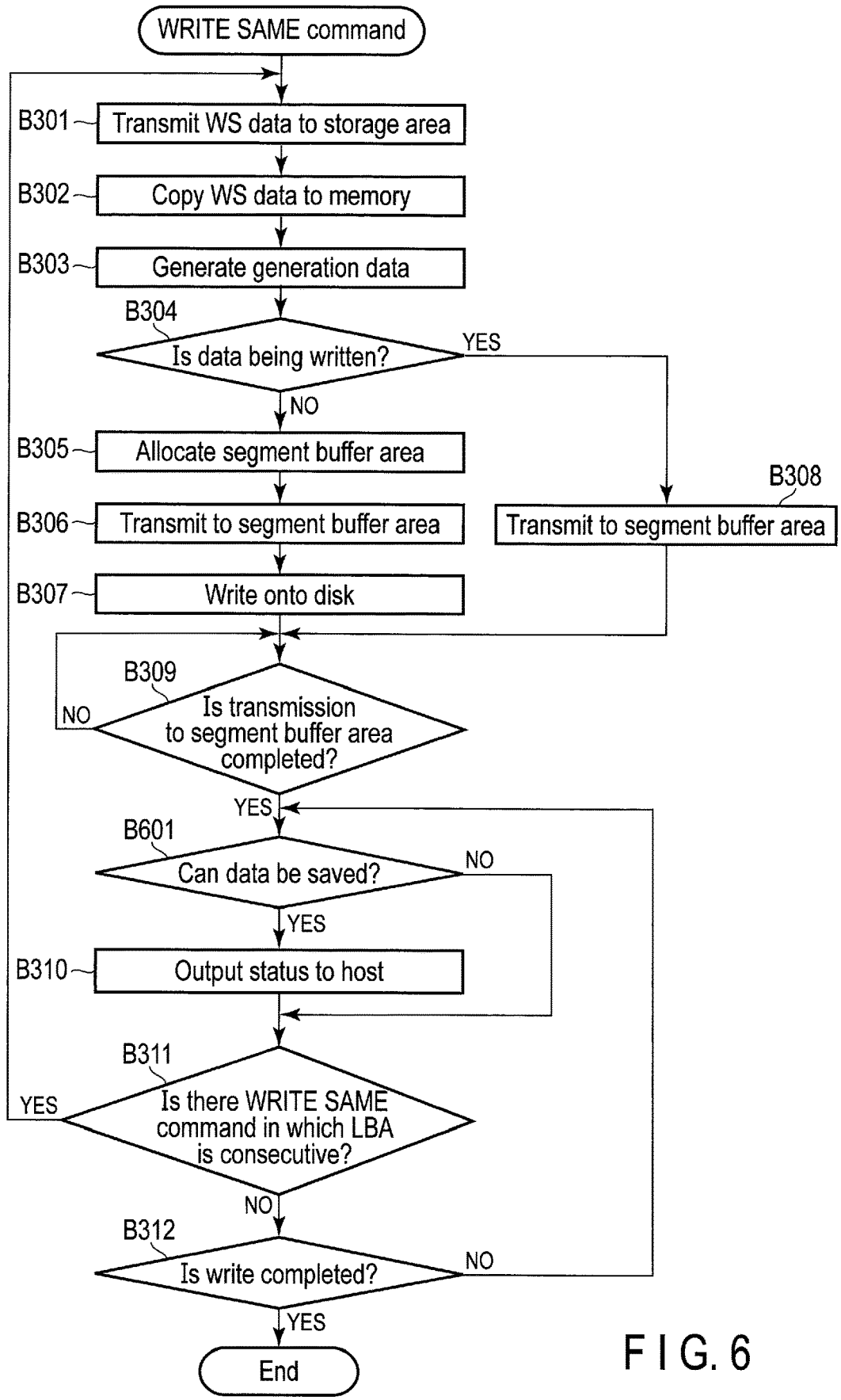
FIG. 6 is a flowchart of an example of a write method according to the second embodiment.

FIG. 6 is a flowchart of an example of the write method according to the second embodiment.

When receiving the WRITE SAME command, the system controller 130 transmits the WS data to the storage area 71 (B301), copies the WS data to the memory 53 (B302), and generates the plurality of generation data based on the WS data (B303). The system controller 130 determines whether data are being written to the disk 10 or not (B304). If it is determined that data are not being written (NO in B304), the system controller 130 allocate the segment buffer area 72 in the buffer memory 70 (B305), sequentially transmits the generation data to the segment buffer area 72 (B306), sequentially writes at least one generation data, which is sequentially transmitted to the segment buffer area 72, to the disk 10 (B307), and proceeds to the processing of the B309. If it is determined that data are being written (YES in B304), the system controller 130 sequentially transmits the plurality of generation data to the segment buffer area 72 allocated in advance (B308).

The system controller 130 determines whether the transmission of the generation data to the segment buffer area 72 is completed or not (B309). If it is determined that the transmission of the plurality of generation data corresponding to the number of transfer blocks is not completed (NO in B309), the system controller 130 returns to the processing of B309. If it is determined that the transmission of the plurality of generation data corresponding to the number of transfer blocks is completed (YES in B309), the system controller 130 determines whether all the unwritten generation data recorded in the segment buffer area 72 can be saved in the non-volatile memory 90 or not (B601). For example, the system controller 130 determines whether the transmission count value is equal to or smaller than the value which can be saved save or greater than the value which can be saved. If it is determined that all the unwritten generation data cannot be saved (NO in B601), the system controller 130 proceeds to the processing of B311. For example, if it is determined that the transmission count value is greater than the value which can be saved, the system controller 130 proceeds to the processing of the B311. If it is determined that all the unwritten generation data can be saved (YES in B601), the system controller 130 outputs the command completion status to the host 100 (B310). For example, if it is determined that the transmission count value is equal to or smaller than the value which can be saved, the system controller 130 outputs the command completion status to the host 100.

The system controller 130 determines whether or not the WRITE SAME command to the consecutive LBAs is received from the host 100 (B311). If it is determined that the WRITE SAME command to the consecutive LBAs is received (YES in B311), the system controller 130 returns to the processing of B301. If it is determined that the WRITE SAME command to the consecutive LBAs is not received (NO in B311), the system controller 130 determines whether the processing of writing all the generation data to the disk 10 is completed or not (B312). If it is determined that the write processing of all the generation data is not completed (NO in B312), the system controller 130 returns to the processing of B601. If it is determined that the write processing of all the generation data is completed (YES in B312), the system controller 130 ends the processing.

Figure 7:
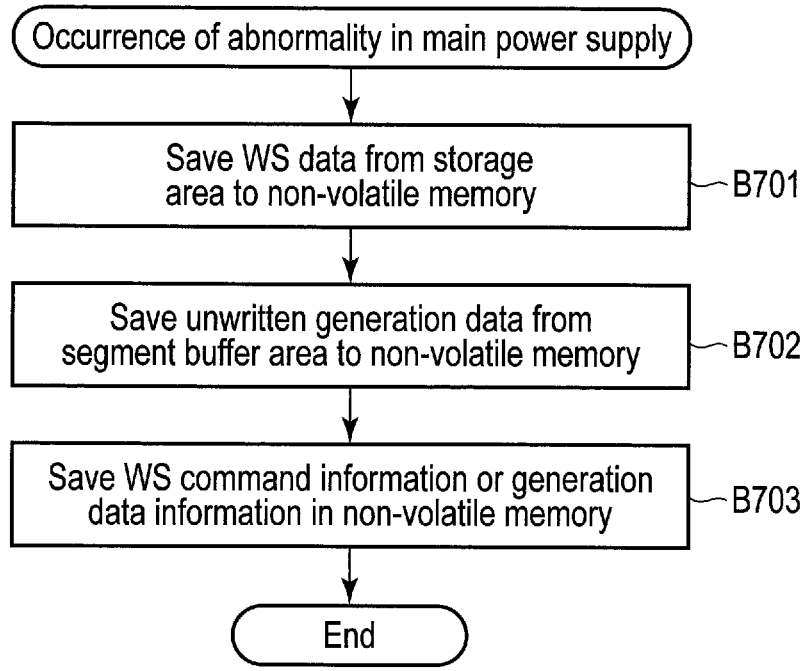
FIG. 7 is a flowchart of an example of a method of saving data related to a WRITE SAME command when abnormality occurs in a main power supply according to the second embodiment.

FIG. 7 is a flowchart of an example of a method of saving data related to the WRITE SAME command when abnormality occurs in the main power supply according to the second embodiment.

When abnormality occurs in the main power supply, the system controller 130 saves the WS data from the storage area 71 to the non-volatile memory 90 (B701). The system controller 130 saves the unwritten generation data from the segment buffer area 72 to the non-volatile memory 90 (B702). The system controller 130 saves the WS command information or the generation data information in the non-volatile memory 90 (B703) and ends the processing.

Figure 8:
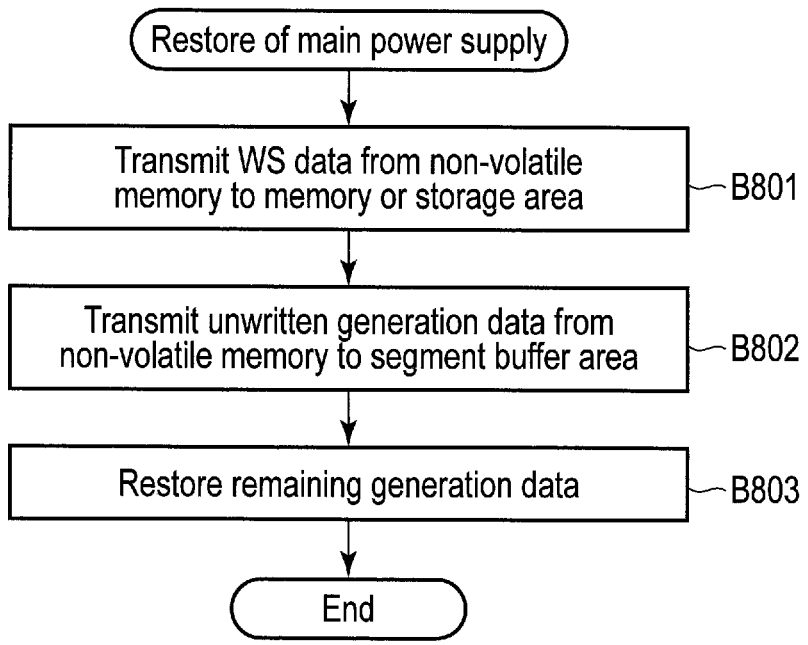
FIG. 8 is a flowchart of an example of a method of restoring data related to the WRITE SAME command when abnormality occurs in the main power supply according to the second embodiment.

FIG. 8 is a flowchart of an example of a method of restoring data related to the WRITE SAME command when abnormality occurs in the main power supply according to the second embodiment.

When the main power supply is restored, the system controller 130 transmits the WS data from the non-volatile memory 90 to the memory 53 and the storage area 71 and records the WS data in the memory 53 and the storage area 71 (B801). The system controller 130 transmits the unwritten generation data from the non-volatile memory 90 to the segment buffer area 72 and records the unwritten generation data in the segment buffer area 72 (B802). The system controller 130 restores the remaining generation data to the memory 53 based on the WS data and the generation data information saved in the non-volatile memory 90 (B803) and ends the processing.

According to the second embodiment, the magnetic disk device 1 determines whether all the unwritten generation data recorded in the segment buffer area 72 can be saved in the non-volatile memory 90 or not. If it is determined that all the unwritten generation data can be saved, the magnetic disk device 1 outputs the command completion status to the host 100. Therefore, even when abnormality unexpectedly occurs in the main power supply, the magnetic disk device 1 can guarantee the generation data corresponding to the WRITE SAME command outputting the command completion status.

When abnormality occurs in the main power supply, the magnetic disk device 1 executes the data protection operation by receiving the power temporarily supplied from the backup power supply 21 by the PLP function. When abnormality occurs in the main power supply, the magnetic disk device 1 saves the WS data recorded in the storage area 71 or at least one unwritten generation data recorded in the segment buffer area 72 in the non-volatile memory 90. In this case, the magnetic disk device 1 can also save the WS command information or the generation data information in the non-volatile memory 90. When the main power supply is restored, the magnetic disk device 1 transmits the WS data from the non-volatile memory 90 to the memory 53 or the storage area 71. In this case, the magnetic disk device 1 transmits the unwritten generation data from the non-volatile memory 90 to the segment buffer area 72. The magnetic disk device 1 restores the remaining generation data to the memory 53 based on the WS data and the generation data information saved in the non-volatile memory 90, sequentially transmits the restored remaining generation data to the segment buffer area 72, and sequentially writes at least one generation data transmitted to the segment buffer area 72 to the disk 10. Therefore, the magnetic disk device 1 can improve the recording quality of data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a disk;
    a head configured to write data to the disk;
    a buffer memory configured to temporarily hold data to be written to the disk;
    a recorder configured to temporarily hold data to be input from the buffer memory; and
    a controller configured to transfer first data from the buffer memory to the recorder and to transfer second data corresponding to the first data from the recorder, wherein
    the controller allocates a first area in the buffer memory, sequentially transmits the second data to the first area, and writes the second data to the disk in the transmission order to the first area.

2. The magnetic disk device according to claim 1, wherein the controller encrypts each of the second data, and adds protection information indicating data consistency to each of the second data.

3. The magnetic disk device according to claim 1, wherein the controller outputs a signal indicating that all the second data are transmitted when all the second data are transmitted to the first area.

4. The magnetic disk device according to claim 3, wherein the controller adds a first value to a count value corresponding to the number of first blocks of the second data transmitted to the first area each time one of the second data is transmitted to the first area and outputs the signal when the count value reaches the number of second blocks of the second data generated based on the first data.

5. The magnetic disk device according to claim 1, further comprising: a first power supply configured to temporarily supply power when abnormality occurs in a main power supply; and a non-volatile memory,
    wherein the controller outputs a signal indicating that all the second data are transmitted when at least one of the second data transmitted to the first area can be saved in the non-volatile memory by the power supplied by the first power supply.

6. The magnetic disk device according to claim 5, wherein the controller adds a first value to a count value corresponding to the number of first blocks of the second data transmitted to the first area each time one of the second data is transmitted to the first area, subtracts the first value from the count value each time the second data is written to the disk, and outputs the signal when the count value reaches the number of third blocks of the second data which can be saved in the non-volatile memory by the power supplied by the first power supply after the count value reaches the number of second blocks of the second data generated based on the first data.

7. The magnetic disk device according to claim 1, wherein if the second data are written to the disk, the controller transfers third data different from the first data, from the buffer memory to the recorder, transfers fourth data corresponding to the third data from the recorder to the first area, and writes to the disk the fourth data in order of being transferred to the first area.

8. The magnetic disk device according to claim 7, wherein the controller receives the first data and the third data, each of which corresponding to a WRITE SAME command when receiving the WRITE SAME command.

9. A magnetic disk device, comprising:
    a disk;
    a head configured to write data to the disk;
    a buffer memory configured to temporarily hold data to be written to the disk;
    a recorder configured to temporarily hold data to be input from the buffer memory; and
    a controller configured to transfer first data corresponding to the first WRITE SAME command from the buffer memory to the recorder, to transfer second data corresponding to the first data from the recorder, to the buffer memory, and to sequentially write the second data transferred to the buffer memory, to the disk.

10. The magnetic disk device according to claim 9, wherein the controller transfers third data corresponding to the second WRITE SAME command received after the first WRITE SAME command, from the buffer memory to the recorder, transfers fourth data corresponding to the third data, from the recorder to the buffer memory, and sequentially writes the fourth data including sixth data of a second logical address sequential with a first logical address of last fifth data in the second data, subsequently to the second data.

11. A write method applied to a magnetic disk device including a disk, a head configured to write data to the disk, a buffer memory configured to temporarily hold data to be written to the disk, and a recorder configured to temporarily hold the data input from the buffer memory, the write method comprising:

transferring first data from the buffer memory to the recorder; and transferring second data corresponding to the first data from the recorder to the buffer memory;

securing a first area in the buffer memory;

sequentially transmitting the second data to the first area; and writing the second data to the disk in the transmission order to the first area.

12. The write method according to claim 11, further comprising:

encrypting each of the second data; and adding protection information indicating data consistency to each of the second data.

13. The write method according to claim 11, further comprising: outputting a signal indicating that all the second data are transmitted, when all the second data are transmitted to the first area.

14. The write method according to claim 13, further comprising:

adding a first value to a count value corresponding to the number of first blocks of the second data transmitted to the first area each time one of the second data is transmitted to the first area; and outputting the signal when the count value reaches the number of second blocks of the second data generated based on the first data.

15. The write method according to claim 11, further comprising:

a first power supply configured to temporarily supply power when abnormality occurs in a main power supply and a non-volatile memory; and outputting a signal indicating that all the second data are transmitted when at least one of the second data transmitted to the first area can be saved in the non-volatile memory by the power supplied by the first power supply.

16. The write method according to claim 15, further comprising:

adding a first value to a count value corresponding to the number of first blocks of the second data transmitted to the first area each time one of the second data is transmitted to the first area;

subtracting the first value from the count value each time the second data is written to the disk; and outputting the signal when the count value reaches the number of third blocks of the second data which can be saved in the non-volatile memory by the power supplied by the first power supply after the count value reaches the number of second blocks of the second data generated based on the first data.

17. The write method according to claim 11, further comprising:

if the second data are written to the disk, transferring third data different from the first data, from the buffer memory to the recorder, transferring fourth data corresponding to the third data from the recorder to the first area; and writing to the disk the fourth data in order of being transferred to the first area.

18. The write method according to claim 17, further comprising: receiving the first data and the third data, each of which corresponding to a WRITE SAME command when the WRITE SAME command is received.

* * * * *